Patented Aug. 24, 1948

2,447,653

UNITED STATES PATENT OFFICE 2,447,653

NITRO AMINES AND PROCESS FOR PREPARING SAME

Harold G. Johnson, Terre Haute, Ind., assignor to Commercial Solvents Corporation, Terre Haute, Ind., a corporation of Maryland No Drawing. Application January 8, 1945, Serial No. 571,954

10 Claims. (Cl. 260—518)

My invention relates to manufacture of new and useful symmetrical 2-nitro-2-alkyl-N,N'-diphenyl-1, 3-propane diamines. More specifically the process of this invention comprises causing a reaction in the presence of a basic catalyst between formaldehyde, a 1-nitroalkane containing more than 1 carbon atom and a primary phenyl amine, selected from a class consisting of phenyl amine and phenyl amines which are substituted in the nucleus with substituents which are non-reactive during the following condensation reaction, by heating a mixture thereof, in the proportions of about 1 mole of the nitro alkane to 2 moles of formaldehyde and 2 moles of the phenyl amine, to promote a condensation reaction and then recovering the resulting diamine. In this process it is possible to produce the formaldehyde and the 1-nitroalkane in the reaction mixture by the decomposition in situ of a 2-nitro-2-alkyl-1,3-propanediol, that is, to react the phenyl amine with 2-nitro-2-alkyl-1, 3-propanediol instead of with a mixture of formaldehyde and nitroalkane. By means of this process the products of this invention can be produced, as disclosed in the following specific examples, these products comprising symmetrical 2-nitro-2-alkyl-N,N'-1,3-propane diamines whose phenyl groups may be substituted with a substituent selected from the group consisting of halogen, alkyl, $NO_2$, OH and $CO_2H$.

This case is a continuation-in-part of my application Serial No. 473,523 filed January 25, 1943, now abandoned.

As examples of compounds which can be produced by my process, there may be mentioned, 2-nitro-2-methyl- N,N'- diphenyl -1,3- propanediamine; 2-nitro-2-ethyl-N,N'-diphenyl-1,3-propanediamine; 2-nitro-2-methyl-N,N'-bis(p-chlorophenyl) -1,3 - propanediamine; 2-nitro-2-methyl - N,N'- di-p-tolyl - 1,3 - propanediamine; 2-nitro-2-methyl-N,N'-bis(p-nitrophenyl) -1,3-propanediamine; 2-nitro - 2 - methyl - N,N'- bis(2-methyl -4- diethylaminophenyl) -1,3- propanediamine; 2-nitro-2-methyl- N,N'-bis(4 - dimethylaminophenyl) - 1,3 - propanediamine; 2-nitro-2-methyl-N,N'-di-p-xenyl - 1,3-propanediamine; 2-nitro-2-methyl- N,N'- bis(2,4 - dimethylphenyl) - 1,3-propanediamine; 2-nitro - 2 - methyl - N,N'-bis(2,4-dichlorophenyl) - 1,3 - propanediamine; also the following compounds and their alkali metal derivatives: 2-nitro-2-methyl-N,N'-bis(p-hydroxyphenyl) -1,3-propanediamine; 2-nitro-2-methyl-N,N'-bis(o-carboxyphenyl) -1,3- propanediamine; 2-nitro-2 - methyl - N,N'- bis(2,3-dicarboxyphenyl) - 1,3 - propanediamine; 2 - nitro - 2-methyl-N,N'-bis(3-sulfo - 4 - methylphenyl) -1,3-propanediamine; 2-nitro-2-methyl - N,N' - bis(2-methyl-4-hydroxyphenyl) - 1,3 - propanediamine and the like.

According to my invention, these nitro amines are prepared by adding formaldehyde to a mixture of an aromatic amine and a primary nitroparaffin having more than one carbon atom. This reaction is carried out in the presence of a basic catalyst and in certain instances it will be found advantageous to effect the same with the aid of a solvent such as methanol, ethanol, butanol, pyridine, triethylamine, tributylamine, and the like.

A modified and frequently-preferred procedure for preparing the compounds of my invention, involves reacting the aromatic amine with a primary nitroalcohol derived from the primary nitroparaffin and formaldehyde described above. This reaction is, likewise, carried out in the presence of a basic catalyst. Under these conditions, the primary nitroalcohol is believed to decompose into formaldehyde and the primary nitroparaffin from which it was derived, thus resulting in the same type of reaction mixture as that obtained when formaldehyde and nitroparaffin are used separately.

Since both of the above-described procedures fundamentally involve reaction mixtures containing formaldehyde, a primary nitroparaffin having more than one carbon atom, and an aromatic amine, it may be seen that the reactions occurring therein, in all essential respects, can be considered equivalents. It is to be specifically understood, therefore, that the terminology employed in certain of the appended process claims is to be construed to cover both of the foregoing modifications.

Temperatures may be employed which range from 25-30° C. to reflux temperature of the reaction mixture. However, in general, I have found it preferable to carry out the majority of such reactions at a temperature of about 50° C.

In the case of aromatic amines having attached thereto an acidic group, such as a carboxyl group, it is preferable to convert them to their corresponding alkali metal salts by treatment with a stoichiometrical quantity of the desired alkali metal hydroxide before use in the reaction. In effecting the condensation between the resulting salt and primary nitroalcohol, water may be employed as the solvent. The condensation product thus obtained may be isolated and purified in the form of the alkali metal salt or converted in a known manner into the free acid by the use of the calculated quantity of mineral acid.

Completion of the reaction is usually evidenced by the appearance of the product in the form of a crystalline precipitate or oily liquid. The product thus produced may be separated from the mother liquor by filtration or distillation and in this form is ordinarily in a state of sufficient purity to meet the requirements of the majority of technical uses. If, however, it becomes necessary to purify the compound further, this object may be accomplished by dissolving the product, if a solid, in a suitable solvent such as methanol, ethanol, butanol, or acetone, and boiling the resulting solution in the presence of decolorizing carbon, after which the mixture is filtered and the purified product obtained by recrystallization from the filtrate or by further distillation if it is a liquid.

The primary nitroparaffins operative in my process may be represented by the following formula:

wherein R is alkyl. Examples of nitroparaffins included by the above formula are nitroethane, 1-nitropropane, 1-nitrobutane, 1-nitropentane, 1-nitrohexane, and the like.

Among the phenyl amines which can be used in my process there may be mentioned aniline, o-, m-, and p-chloroaniline, dichloroaniline, o-, m-, and p-toluidine, o-, m-, and p-nitroaniline, 2,4 - dimethylaniline, 2,4 - dichloroaniline, 2-methyl-4-diethylaminoaniline, 4-N,N - dimethylaminoaniline, 4-aminobiphenyl - (4 - phenylaniline), the following amines and their alkali metal salts: o-, m-, and p-hydroxyanilines, o-, m-, and p-sulfoanilines, o-, m-, and p-carboxyanilines, 2,3-dicarboxyaniline, 4-methyl-3-sulfoaniline, 2-methyl-4-hydroxyaniline and the like.

Suitable nitrohydroxy compounds which may be utilized are represented by the formula:

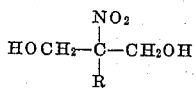

wherein R is an alkyl radical. Examples of suitable nitrohydroxy compounds are 2-nitro-2-methyl-1,3-propanediol; 2-nitro-2-ethyl-1,3-propanediol; 2-nitro-2-propyl - 1,3 - propanediol; 2-nitro-2-butyl-1,3-propanediol; 2-nitro-2-pentyl-1,3-propanediol; 2-nitro-2-hexyl-1,3-propanediol, and the like.

The presence of a basic material either employed as catalyst or provided by the nature of reactants is necessary to the reaction, in the absence of such a basic condition, no reaction appears to take place. The quantity of catalyst if employed may vary; however, in most instances it will be found desirable to employ the catalyst in concentrations of a least about 0.02%, based upon the weight of the aromatic amine used. In general, it may be said that the quantity utilized in excess of 0.02% is not critical. The basic catalyst may be an inorganic base such as sodium or potassium hydroxide, or it may be organic such as a tertiary organic amine, a quaternary ammonium compound, or the like. Certain catalysts such as pyridine, triethylamine, or tributylamine may serve a two-fold purpose in certain instances, since these particular compounds can be used both as a catalyst and as a solvent for the reactants. Examples of other suitable catalysts for this reaction are the quaternary bases such as tetramethylammonium hydroxide, tetraethylammonium hydroxide, trimethylbenzylammonium hydroxide, and the like. Hydroxides of the alkali metals, such as sodium and potassium hydroxides, also serve as suitable catalysts for the reaction.

The following examples describe certain of the new nitroamines, and methods for their preparation; however, they are not to be in any way construed as limiting my invention, since I have found that the reaction between aromatic amines of the type mentioned above, with formaldehyde and the primary nitroparaffins described, or the corresponding dihydroxy nitro compounds prepared therefrom is very general and may readily be effected when carried out in the presence of a suitable basic catalyst.

EXAMPLE I

*2-nitro-2-methyl-N,N'-diphenyl-1,3-propanediamine*

A mixture consisting of 196 parts of aniline, 135 parts of 2-nitro-2-methyl-1,3-propanediol and 5 parts of trimethylbenzylammonium hydroxide was permitted to react at a temperature of 50° C. with occasional agitation. As the reaction progressed, a layer of water was observed to form on top of the reaction mixture, and when further formation of water had apparently ceased, the crude mass was allowed to stand at room temperature, whereupon a yellow crystalline product precipitated. After one recrystallization from methanol, a total of 201.2 parts of yellow crystalline 2-nitro - 2 - methyl - N,N' - diphenyl-1,3-propanediamine, melting at 110.2° C. was obtained, corresponding to a yield of 70.5%.

Nitrogen analysis: Calculated—14.7%; found 14.52%.

EXAMPLE II

*2-nitro-2-ethyl-N,N'-diphenyl-1,3-propanediamine*

One-hundred and forty-nine parts (1 mole) of 2-nitro-2-ethyl-1,3-propanediol were mixed with 186 parts (2 moles) of aniline in a reaction vessel. Three and three-tenths parts of potassium hydroxide dissolved in 17 parts by volume of methanol were added and the mixture was warmed until the glycol dissolved. The mixture was then placed in a constant temperature water bath at 50° C. for 42 hours. To the resulting oily product was added 200 parts by volume of benzene whereupon two liquid layers formed. The water layer was removed and the benzene was evaporated to recover the 295 parts liquid 2-nitro -2- ethyl -N,N'- diphenyl -1,3- propanediamine, corresponding to a yield of 98%. This compound had a brown color. Its nitrogen content was found to be 13.27%. Theoretical 14.03%. Refractive index $N_D^{20}$ 1.585;

sp. gr. $\frac{20}{20}$° C. 1.134

EXAMPLE III

*2-nitro-2-methyl-N,N'-bis(p-chlorophenyl)-1,3-propanediamine*

Sixty-seven and one-half parts (½ mole) of 2-nitro-2-methyl-1,3-propanediol were mixed with 127.5 parts (1 mole) of p-chloro aniline and to this mixture were added 1.95 parts of potassium hydroxide dissolved in 10 parts by volume of methanol. The mixture was heated until the glycol dissolved and was then placed in a water bath at 50° C. for 42 hours. The mixture was then alternatively cooled in dry ice and warmed to room temperature until yellow crystals formed, then the crystals were filtered and washed with water and alcohol and dried. The crystals amounted to 68.6 parts, corresponding to a yield of 44% of 2-nitro-2-methyl-N,N'-bis-p-chlorophenyl-1,3-propanediamine. The analysis showed a nitrogen content of 11.33 as compared to theoretical of 11.82 for this compound and a melting point of 140° C.

EXAMPLE IV

*2-nitro-2-methyl-N,N'-di-p-tolyl-1,3-propanediamine*

Two-hundred and fourteen parts (2 moles) of p-toluidine were mixed with 135 parts (1 mole) of 2-nitro-2-methyl-1,3-propanediol and 3.5 parts of potassium hydroxide in 18 parts by volume of methyl alcohol were added thereto. The mixture was warmed until the glycol dissolved and then placed in a water bath at 50° C. for 42 hours. The yield of yellow colored 2-nitro-2-methyl-N,N'-di-p-tolyl-1,3-propanediamine was 259.5 parts or 83%. It had a melting point of 146.8° C. Its nitrogen content analyzed 12.96 as compared to 13.4 theoretical value for this compound.

EXAMPLE V

*2-nitro-2-methyl-N,N'-bis(p-nitrophenyl)-1,3-propanediamine*

Two-hundred and seven parts (1.5 moles) of p-nitro aniline were mixed with 101.5 parts (.75 mole) of 2-nitro-2-methyl-1,3-propanediol and 3 parts of potassium hydroxide dissolved in 115 parts by volume of methyl alcohol were added. The mixture was placed in a water bath at 50° C. for 42 hours, whereupon a yellow pasty mass formed. This mass was refluxed with 500 parts by volume of methyl alcohol and allowed to stand overnight, whereupon the mass was centrifuged and the resulting yellow solid removed and dried, resulting in 159.8 parts of 2-nitro-2-methyl-N,N'-bis(p-nitrophenyl)-1,3-propanediamine, corresponding to a yield of 57%. The solid had a melting point of 240° C.; a nitrogen content of 18.85% as compared to 18.65 theoretical for this compound.

EXAMPLE VI

*2-nitro-2-methyl-N,N'-bis(p-hydroxyphenyl)-1,3-propanediamine*

Ninety parts (0.817 mole) of p-aminophenol were mixed with 55 parts (0.48 mole) of 2-nitro-2-methyl-1,3-propanediol and 1.4 parts of potassium hydroxide dissolved in 107.5 parts by volume of methyl alcohol were added. Then the mixture was placed in a water bath at 50° C. for 42 hours. The resulting colorless solid, 2-nitro-2-methyl-N,N'-bis(p-hydroxyphenyl)-1,3-propanediamine was recrystallized from butyl alcohol and 25.7 parts of the colorless crystals were recovered, amounting to a yield of 20%. This compound had a melting point of 170° (decomp.) and a nitrogen content of 12.94% as compared to a theoretical of 13.22%.

EXAMPLE VII

*2-nitro-2-methyl-N,N'-bis(o-carboxyphenyl)-1,3-propanediamine*

To 110 parts (0.805 mole) of anthranilic acid were added 254 parts by volume of 3.38 normal potassium hydroxide in methyl alcohol, then 55 parts (.40 mole) of 2-nitro-2-methyl-1,3-propanediol. This mixture was allowed to stand at room temperature for 15 days and was then treated with dilute HCl to convert the sodium salt to the desired acid. The black gummy solid which precipitated was dissolved in butanol and reprecipitated with cyclohexane. Upon filtering and washing with naphtha, 116 parts of bluish-black solid 2-nitro-2-methyl-N,N'-bis(o-carboxyphenyl)-1,3-propanediamine was recovered, having a melting point of 167.5° C. and amounting to a yield of 79%. The nitrogen content found was 10.78% as compared to a theoretical of 11.25 for this compound.

EXAMPLE VIII

*Preparation of 2-nitro-2-methyl-N,N'-diphenyl-1,3-propanediamine*

A mixture of 186 parts of aniline, 75 parts of nitroethane, 500 parts of methanol, and 1.9 parts of potassium hydroxide was heated to reflux and 150 parts of 40% formaldehyde solution was added over a period of four hours. Reflux was continued for four hours more after the formaldehyde was added. When the solution cooled, two layers formed. The entire mixture was vacuum distilled until free from methanol and water. Repeated cooling of the residue in dry ice produced crystals which, when separated and dried, amounted to 31 parts. Recrystallization from methanol resulted in bright yellow crystals melting at 111° C. and containing 14.4% nitrogen (theory 14.7%). Hydrogenation of the mother liquor to 2-amino-2-methyl-N,N'-diphenyl-1,3-propanediamine indicated that the actual yield was about 50% of theory.

EXAMPLE IX

*Preparation of 2-nitro-3-methyl-N,N'-bis(p-nitrophenyl)-1,3-propanediamine*

A mixture of 62.6 parts of p-nitroaniline, 17 parts of nitroethane, 225 parts of methanol and 0.95 part of potassium hydroxide was refluxed while 34 parts of formaldehyde was added in one hour. Reflux was continued for four hours. When the mixture was cooled, yellow crystals came out. These amounted to 42.3 parts and proved to be p-nitroaniline. The mother liquor was evaporated to a smaller volume and cooled to induce crystallization. The dry crystals amounted to 23 parts corresponding to a conversion of 27% and yield of 83% based on p-nitroaniline. Recrystallization from butanol gave bright yellow, bulky, fibrous crystals which melted at 240° C. and contained 17.9% of nitrogen (theory 18.6% nitrogen).

EXAMPLE X

*Preparation of 2-nitro-2-methyl-N,N'-di-p-tolyl-1,3-propanediamine*

A mixture of 97 parts of p-toluidine, 34 parts of nitroethane, 200 parts of methanol and 1.33 parts of potassium hydroxide was heated to reflux and 68 parts of formaldehyde solution was dropped in in 2½ hours. Reflux was continued for three hours. When cooled, a large quantity of crystals formed which, when separated and dried, amounted to 118 parts corresponding to a yield of 76.6%. Recrystallization from methanol gave cream colored crystals which melted at 147° C. and contained 12.9% of nitrogen. (Theoretical nitrogen 13.4%.)

Example XI

*Preparation of 2-nitro-2-methyl-N,N'-bis(p-chlorophenyl)-1,3-propanediamine*

A mixture of 127.5 parts of p-chloroaniline, 37.5 parts of nitroethane, 5 parts of trimethylbenzylammonium hydroxide, and 300 parts of methanol was agitated and 75 parts of formaldehyde was added in three hours at slightly above room temperature. The mixture was then heated at 60–65° for five hours and distilled till free from methanol. The oil layer of the residue was separated from the water and an equal volume of butanol was added and the solution was cooled in dry ice and allowed to warm to room temperature. This caused the formation of crystals which, when separated and dried, amounted to 59.2 parts corresponding to a yield of 33.4%. Recrystallization from methanol gave yellow crystals which melted at 137° C. and contained 11.52% nitrogen (theoretical nitrogen 11.85%).

The nitroamines of the type described above are useful in the preparation of compositions having a wide variety of valuable characteristics, such as for example, dyes, anti-skinning agents, indicators, pharmaceuticals, photographic preparations, and the like.

It will be noted that in the above specific examples the phenyl groups of the nitroamines produced by the described processes are substituted with a substituent selected from the group consisting of halogen, alkyl, $NO_2$, OH and $CO_2H$.

While the above describes the preferred embodiments of my invention, it will be understood that departures may be made therefrom within the scope of the specification and claims.

What is claimed is:

1. 2-nitro-2-methyl-N,N'-bis(o-carboxyphenyl)-1,3-propanediamine.
2. 2-nitro-2-ethyl-N,N'-diphenyl-1,3-propanediamine.
3. 2-nitro-2-methyl-N,N'-di-p-tolyl-1,3-propanediamine.
4. A process for preparing 2-nitro-2-methyl-N,N'-bis(o-carboxyphenyl)-1,3-propanediamine which comprises reacting an alkali metal salt of anthranilic acid with formaldehyde and nitroethane, in the presence of a basic catalyst and in the proportions of about 1 mole of the nitroethane to 2 moles of formaldehyde and 2 moles of the anthranilic acid, and thereafter treating with an acid.
5. A process for preparing 2-nitro-2-ethyl-N,N'-di-p-tolyl-1,3-propanediamine which comprises reacting aniline with formaldehyde and nitroethane, in the presence of a basic catalyst and in the proportions of about 1 mole of the nitroethane to 2 moles of formaldehyde and 2 moles of the aniline.
6. A process for preparing 2-nitro-2-methyl-N,N'-di-p-tolyl-1,3-propanediamine which comprises reacting p-toluidine with formaldehyde and nitroethane, in the presence of a basic catalyst and in the proportions of about 1 mole of the nitroethane to 2 moles of formaldehyde and 2 moles of the p-toluidine.
7. The process of claim 8 in which the basic catalyst is an alkali metal hydroxide.
8. In the production of diamines the process which comprises causing a reaction in the presence of a basic catalyst between formaldehyde, a 1-nitroalkane containing more than one carbon atom and a primary phenyl amine selected from a class consisting of phenyl amine and phenyl amines which are substituted in the nucleus with substituents which are non-reactive during the following condensation reaction, by heating a mixture thereof, in the proportions of about 1 mole of the nitroalkane to 2 moles of formaldehyde and 2 moles of the phenyl amine, to a temperature ranging from at least about 25° C. to the reflux temperature of the mixture to promote a condensation reaction and then recovering the resulting diamine.
9. The process of claim 8 wherein the formaldehyde and the 1-nitroalkane in the reaction mixture are derived from the decomposition in situ of a 2-nitro-2-alkyl-1,3-propanediol.
10. As novel compounds, symmetrical 2-nitro-2-alkyl-N,N'-diphenyl-1,3-propane diamines in which the phenyl groups are selected from a class consisting of phenyl and phenyl groups substituted with a substituent selected from the group consisting of halogen, alkyl, $NO_2$, OH and $CO_2H$.

HAROLD G. JOHNSON.

REFERENCES CITED

The following references are of record in the file of this patent:

UNITED STATES PATENTS

| Number | Name | Date |
|---|---|---|
| 2,292,212 | Dickey | Aug. 4, 1942 |
| 2,298,375 | Hasche | Oct. 13, 1942 |

OTHER REFERENCES

DeManny, Bul. Soc. Chim. de France, (5) 4, (1937), pages 1454 to 1458.

Certificate of Correction

Patent No. 2,447,653.

August 24, 1948.

HAROLD G. JOHNSON

It is hereby certified that errors appear in the printed specification of the above numbered patent requiring correction as follows: Column 6, line 41, Example IX, for "2-nitro-3-methyl" read *2-nitro-2-methyl*; column 7, line 54, claim 5, for "di-p-tolyl" read *diphenyl*; and that the said Letters Patent should be read with these corrections therein that the same may conform to the record of the case in the Patent Office.

Signed and sealed this 16th day of November, A. D. 1948.

[SEAL]

THOMAS F. MURPHY,
*Assistant Commissioner of Patents.*